United States Patent
Ellis et al.

(10) Patent No.: US 7,186,273 B2
(45) Date of Patent: Mar. 6, 2007

(54) TREATMENT OF TEXTILES WITH FLUORINATED POLYETHERS

(75) Inventors: John Ellis, Duffield (GB); Susan Bamford, Ripley (GB); Claire Louise Balcomb, Matlock (GB)

(73) Assignee: Devan-PPT Chemicals Limited, Derby (GB)

( * ) Notice: Subject to any disclaimer, the term of this patent is extended or adjusted under 35 U.S.C. 154(b) by 182 days.

(21) Appl. No.: 10/483,902

(22) PCT Filed: Jul. 17, 2002

(86) PCT No.: PCT/GB02/03279

§ 371 (c)(1),
(2), (4) Date: Jun. 1, 2004

(87) PCT Pub. No.: WO03/008700

PCT Pub. Date: Jan. 30, 2003

(65) Prior Publication Data

US 2006/0105654 A1    May 18, 2006

(30) Foreign Application Priority Data

Jul. 17, 2001    (GB)    ................... 0117336.8

(51) Int. Cl.
*D06M 15/53*    (2006.01)
*D06M 15/647*    (2006.01)

(52) U.S. Cl. .................. 8/115.6; 8/127.5; 8/127.6; 8/147; 8/128.1; 8/181; 252/8.62; 564/300; 564/301; 442/120; 525/521

(58) Field of Classification Search ................ 568/583, 568/589; 8/115.6, 127.5, 127.6, 147, 128.1, 8/181; 252/8.62; 564/300, 301
See application file for complete search history.

(56) References Cited

U.S. PATENT DOCUMENTS 4,094,911 A  *  6/1978  Mitsch et al. ................ 568/615
5,755,827 A  *  5/1998  Bamford et al. ............. 8/128.3

FOREIGN PATENT DOCUMENTS

| EP | 0 414 377 A |   | 2/1991 |
| EP | 0 430 887 A |   | 6/1991 |
| EP | 1 006 168 A |   | 6/2000 |
| GB | 1 571 188 | * | 7/1980 |
| WO | WO 93 19142 A |   | 9/1993 |
| WO | WO 98 11293 A |   | 3/1998 |

* cited by examiner

*Primary Examiner*—Rosalynd Keys
(74) *Attorney, Agent, or Firm*—McDermott Will & Emery LLP

(57) ABSTRACT

A polymer adapted for the Shrink resist treatment of textile materials imparting water, stain and/or oil repellency. The polymer includes a fluorinated polyether.

46 Claims, No Drawings

TREATMENT OF TEXTILES WITH FLUORINATED POLYETHERS

This application is a U.S. national filing under 35 U.S.C. 371 and claims priority from PCT/GB02/003279, filed Jul. 17, 2002, and from British Application No. 0117336.8 filed Jul. 17, 2001.

This invention relates to polymer treatments for textiles.

Fluorinated polymers may be applied to textile articles so as to render them water, oil and/or stain repellent.

There are many processes for imparting a chemical finish to wool garments to prevent them felting during domestic laundering. The Dylon GRB and SIMPLX process are two examples, which apply polymers to the garments. The polymers may additionally result in other desirable properties, for example, reduction in pilling.

Woollen garments can be given a shrink resist (felting resist) treatment eg. by either of the processes named above, and then treated with a fluorinated polymer to impart water, stain and/or oil repellency. However, the latter treatment generally results in a harsh handle, and in order to be effective, the polymer must be cured by baking the treated articles, after drying, at temperatures up to 130° C., which has a deleterious effect on wool fibre.

The present invention provides a novel polymer for the treatment of textile materials that does not suffer this disadvantage, and which, surprisingly, has wide application in imparting water, stain and oil repellency.

The invention comprises a polymer adapted for the treatment of textile materials, comprising a fluorinated polyether.

The polymer may be of the type -A-B-A-B-, where A is a polyether amine and B is a fluorine compound. B may be a polyether chain, and may be a perfluoro polyether. The perfluoro polyether may be reacted with a hydropolyether.

The polymer may comprise an ester of a perfluoro polyether reacted with a polyether amine, such as polytetrahydrofuran-diamine.

The polymer may have added epichlorohydrin.

The polymer may be adapted for the shrink resist treatment of keratinous fibre and also imparting water, stain and/or oil repellency.

The invention also comprises a polymer comprising a fluorinated polyether adapted for the treatment of vegetable and synthetic fibre imparting water, stain and/or oil repellency thereto with a soft handle as compared to fluorinated polyurethanes or fluorinated polyacrylates.

The polymer may be adapted for the treatment of textiles by being in aqueous solution; the concentration of the polymer in the solution may be up to 20%, for example, 10%.

The invention also comprises a method for making a polymer comprising a fluorinated polyether, comprising reacting a polyether amine, such as polytetrahydrofuran-diamine with an ester of a perfluoroether. The ester may be Fomblin 5027X or Fomblin 5028X, of molecular weights approximately 1000 and 1500 respectively, supplied by Ausimont Spa.

The ratio of diamine to ester may be between 7:6 and 2:1, and may be 7:6, 5:4, 3:2 or 2:1.

The reaction may be carried out by heating under vacuum in the presence of an acid, which may be para-toluene sulphonic acid, which may be present at 2% by weight in the total reactants.

The reaction may be carried out at between 130° C. and 160° C., say 150° C., the heating being continued for one to three hours, for example two hours. After the heating, the product may be maintained under vacuum for a further period of one to four hours, say three hours. The product may then be cooled to below 110° C. and, whilst still fluid, dissolved in iso-propanol and water with vigorous stirring. Epichlorohydrin may be added to this solution and reacted at 65° C. until the pH falls to a value below 7.2.

Formic acid may then be added to halt the reaction, to give a pH of 3.5 The solution may then be diluted with water so as to contain up to 20%, eg. 10% solids.

The invention also comprises a method for the treatment of keratinous fibre comprising applying to it a polymer comprising a fluorinated polyether, especially one made by a method as above described.

The polymer may be applied by padding or by coating.

The polymer may be applied by exhausting it on to the fibre.

The polymer may be applied in a treatment bath with liquor to goods ratio of 30:1. The treatment bath may be heated to 40° C.

The polymer may be applied at 4 to 8% by weight on weight of goods. After the treatment, the fibres may be dried at a temperature which need be no higher than 80° C., (ie. in a tumble drier) even at room temperature, thus avoiding deterioration of the fibre and hard handle.

A keratinous fibre may be pre-treated with permonosulphate or chlorine or a chlorine donor, followed by sulphite neutralisation and rinsing.

The invention also comprises a method for the treatment of vegetable and/or synthetic fibre to impart water, stain and/or oil repellency with soft handle, comprising treating the fibre with a fluorinated polyether as above described or made by a method as above described.

The polymer may be applied from a solution containing 60 g/l of polymer in water.

The rate of application of polymer to fibre may be 6% polymer by weight of fabric.

For the treatment, the fibre will usually be in fabric, eg. woven or knitted form, but yarn or tow may also be treated.

The preparation of a fluorinated polyether according to the invention and its use in the treatment of textile materials will now be described with reference to the following Examples

EXAMPLE 1

Polytetrahydrofuran-diamine (of approximate molecular weight 1700) and Fomblin 5027X or 5028X (the esters of a perfluoropolyether, molecular weights approximately 1000 and 1500 respectively, ex Ausimont, Spa) were reacted at various ratios (see Table 1) by heating at 150° C. under a vacuum in the present of para-toluene sulphonic acid (2% by weight on the total weight of reactants). The mixture was heated to 150° C. over a period of two hours under vacuum and maintain at this condition for a further three hours. The reaction mixture was cooled to below 100° C. and, whilst still hot, the resulting product was dissolved in iso-propanol and water with vigorous stirring.

To this solution was added epichlorohydrin according to Table 1, and the whole mixture was further reacted at 65° C. until the pH of the solution fell to below a value of 7.2. To halt the reaction, sufficient formic acid was added to give a pH value of 3.5, and the whole was then diluted further with water to give a resulting solution containing approximately 10% solids.

TABLE 1

| Product Ref | Fomblin reactant used | Ratio of A (PTHF) to B (Fomblin) | Ratio of PTHF to ech | F content of polymer (%) | % activity |
|---|---|---|---|---|---|
| SP1252 | 5027X | 2:1 | 0.83 | 11.5 | 10 |
| SP1253 | 5028X | 2:1 | 0.83 | 16.2 | 10 |
| SP1254 | 5028X | 3:2 | 1.25 | 19.2 | 10 |
| SP1255 | 5027X | 3:2 | 1.25 | 14.5 | 10 |
| SP1256 | 5028X | 1:1 | 1.25 | 25.5 | Insoluble |
| SP1260 | 5028X | 5:4 | 2.00 | 22.6 | 10 |
| SP1261 | 5028X | 7:6 | 2.86 | 23.6 | 10 |

EXAMPLE 2

Knitted lambswool fabric swatches (2/17 Nm woollen spun yarn) were treated by the Dylan SIMPL-X method using permonosulphate. After sulphite neutralisation and rinsing, each of the swatches was further treated with some of the materials produced in Example 1 by exhausting the polymer on to the wool swatch in a treatment bath at 40° C. and a liquor to goods ratio of 30:1. The amount of product applied in each case was 4.5% by weight on weight of fabric.

For comparison, further treatments were made with Polymer TM (a commercial shrink resist polymer) only at 4% by weight. Two swatches were made of each treatment; one was dried at room temperature, the second dried in a tumble dryer (70–75° C.). The prepared fabric swatches were tested (Table 2) for oil and water repellency immediately and after washing for and five machine wash cycles respectively in a domestic washing machine (using detergent) on a wool cycle. Good water repellency was achieved and maintained at these levels, although oil repellency was low, and was generally lost after washing.

TABLE 2

| Product | Drying Temp* | Initial Oil | Initial Water | 1 × HLCC7 Oil | 1 × HLCC7 Water | 5 × HLCC7 Oil | 5 × HLCC7 Water |
|---|---|---|---|---|---|---|---|
| SP1252 | RT | 2 | 5 | 1 | 3 | 0 | 5 |
|  | TD | 2 | 5 | 2 | 5 | 0 | 5 |
| SP1253 | RT | 2 | 5 | 1 | 3 | 0 | 5 |
|  | TD | 2 | 5 | 2 | 5 | 0 | 5 |
| SP1254 | RT | 2 | 6 | 0 | 5 | 1 | 5 |
|  | TD | 3 | 5 | 2 | 5 | 0 | 5 |
| SP1255 | RT | 2 | 5 | 0 | 5 | 0 | 5 |
|  | TD | 2 | 5 | 0 | 5 | 0 | 5 |
| Polymer TM | RT | 0 | 1 | 0 | 2 | 0 | 3 |
|  | TD | 0 | 3 | 0 | 3 | 0 | 3 |

*RT = Room temperature, TD = Tumble Dryer

EXAMPLE 3

Further swatches were prepared in a similar manner to those in Example 2, using the material with the highest level of fluorine—SP1261. In this example, 8% by weight of fluorinated product was applied to SIMPL-X treated wool swatches. A comparison was made with a swatch treated with 4% Polymer TM followed (in a fresh bath) by 3% Foraperle 390 (ex Atofina) a commercial fluoroacrylate resin for textile treatments. Following the Polymer TM/Foraperle 390 treatment, the treated swatch was dried in a tumble dryer, then cured at 130° C. for 4 minutes. All other swatches were dried in a tumble dryer only.

The swatches prepared in this Example were tested for the following: shrink resistance to the WoolMark Company's Total Easy care standard—ref TM254; oil repellency to AATCC Method 118; water repellency; spray rating to BS3702 and durability of these effects to machine washing on a wool cycle in a domestic washing machine (20 wash cycles). The results are shown in Table 3.

TABLE 3

| Product | TM254 | Initial Results Oil | Initial Results Water | Initial Results Spray | After 20 wool cycle washes Oil | After 20 wool cycle washes Water | After 20 wool cycle washes Spray |
|---|---|---|---|---|---|---|---|
| SP1261 | +0.2% | 2 | 5 | 4 | 0 | 5 | 3 |
| TM/F390 | +0.3% | 3 | 6 | 4 | 0 | 3 | 0 |

EXAMPLE 4

Further applications of the material used in Example 3 were made at lower addition rates to determine the limit of effectiveness of the material as both a shrink resistant polymer and repellent finish. In these tests, SP1261 was applied at 8%, 6% and 4% by weight on SIMPL-X treated knitted wool swatches in the manner described in Example 2. The shrink-resist performance, oil and water repellency and spray rating were determined, and the durability of these effects to 20 wool cycle washes evaluated (Table 4). The performance of the product was found to be unaffected by decreasing application levels down to 4%.

TABLE 4

| % SP1261 | TM254 | Initial Results Oil | Initial Results Water | Initial Results Spray | After 20 wool cycle washes Oil | After 20 wool cycle washes Water | After 20 wool cycle washes Spray |
|---|---|---|---|---|---|---|---|
| 4% | +2.6% | 2 | 5 | 4 | 0 | 5 | 3 |
| 6% | +0.15% | 2 | 6 | 4 | 0 | 5 | 3 |
| 8% | 0.9% | 2 | 5 | 4 | 0 | 5 | 3 |

EXAMPLE 5

The product used in Example 3 (SP1261) was applied to cotton jersey fabric (single jersey) and woven polyester fabric by a padding process from a solution containing 60 g/l of product in water. The pick-up of liquor on the fabric after padding was adjusted to 100%, giving an equivalent application rate of 6% product by weight of fabric (equivalent to 0.6% solids). After drying in a tumble dryer (70–80° C.) the fabrics were tested for oil and water repellency and compared with untreated control fabrics. The following results were obtained (Table 5).

TABLE 5

|  | Cotton, untreated | Cotton + SP1261 | Polyester, untreated | Polyester + SP1261 |
|---|---|---|---|---|
| Oil repellency | 0 | 0 | 0 | 1 |
| Water repellency | 0 | 4 | 0 | 4 |

It will be seen that the fluorinated polyether was effective as a water and stain repellent, even after multiple laundering cycles. It was initially effective as an oil repellent, but this property tended to be lost on laundering. Nevertheless, for goods which are not normally laundered, eg. awnings, tent canvasses and so forth, this can be useful protection.

The polymer was very effective on keratinous fibre (lambs' wool) as well as a shrink-resist finish.

On cotton and woven polyester fabrics, the polymer gives water repellency without the imposition of a harsh handle.

Clearly, other fluorinated polyethers will have similar, if not identical effects. Armed with the present disclosure it will be straightforward to investigate other preparations and treatment specifications to achieve useful results.

In addition, it has been found that when wool textiles and fibres are treated with a polymer in accordance with the invention, they can be washed at higher temperatures and/or using more agressive washes than would normally be the case. For example, a wool swatch treated with the polymer may be washed in temperatures up to 60° C.

The invention claimed is:

1. A polymer adapted for the treatment of textile materials, comprising a fluorinated polyether of the type -A-B-A-B-, where A is a polyether amine and B is a fluorine compound.

2. A polymer according to claim 1, where B is a polyether chain.

3. A polymer according to claim 2, where B is a perfluoro polyether.

4. A polymer according to claim 3, in which the perfluoro polyether is reacted with a hydropolyether.

5. A polymer according to claim 1, comprising an ester of a perfluoropolyether reacted with a polyether amine.

6. A polymer according to claim 5, in which the polyether amine comprises polytetrahydrofuran-diamine.

7. A polymer according to claim 5, with added epichlorohydrin.

8. A polymer according to claim 1, adapted for the shrink resist treatment of keratinous fibre and also imparting water, stain and/or oil repellency.

9. A polymer according to claim 1, adapted for the treatment of vegetable and synthetic fibre, imparting water, stain and/or oil repellency thereto with a soft handle as compared to fluorinated polyurethanes or fluorinated acrylates.

10. A polymer according to claim 1, in aqueous solution.

11. A polymer according to claim 10, in which the concentration of the polymer in the solution is up to 20%.

12. A polymer according to claim 11, in which the concentration is 10%.

13. A method for making a polymer according to claim 1, comprising reacting polytetrahydrofuran-diamine with a ester of a perfluoroether.

14. A method according to claim 13, in which the ester is Fomblin 5027X.

15. A method according to claim 13, in which the ester is Fomblin 5028X.

16. A method according to claim 13, in which the ratio of diamine to ester is between 7:6 and 2:1.

17. A method according to claim 16, in which the ratio is 7:6.

18. A method according to claim 16, in which the ratio is 5:4.

19. A method according to claim 16, in which the ratio is 3:2.

20. A method according to claim 16, in which the ratio is 2:1.

21. A method according to claim 13, in which the reaction is carried out by heating under vacuum in the presence of an acid.

22. A method according to claim 21, in which the acid is para-toluene sulphonic acid.

23. A method according to claim 22, in which the acid is present at 2% by weight on the total of reactants.

24. A method according to claim 21, in which the reaction is carried out at between 130° C. and 160° C.

25. A method according to claim 24, in which the reaction is carried out at 150° C.

26. A method according to claim 21, in which the heating is continued for between one and three hours.

27. A method according to claim 26, in which the heating is continued for two hours.

28. A method according to claim 26, in which after the heating the product is maintained under vacuum for a further period of one to four hours.

29. A method according to claim 28, in which the further period is three hours.

30. A method according to claim 28, in which the product is cooled to below 110° C. and, whilst still fluid, dissolved in iso-propanol and water with vigorous stirring.

31. A method according to claim 30, in which epichlorohydrin is added to the solution and reacted at 65° C. until the pH falls to a value below 7.2.

32. A method according to claim 24, in which formic acid is added, to halt the reaction, to give a pH of 3.5.

33. A method according to claim 32, in which the solution is diluted with water so as to contain up to 20% solids.

34. A method according to claim 33, in which the solution is diluted with water so as to contain 10% solids.

35. A method for the treatment of keratinous fibre comprising the step of applying a polymer comprising a fluorinated polyether of the type —A-B-A-B- where A is a polyether amine and B is a fluorine compound.

36. A method according to claim 35, in which the polymer is applied by padding.

37. A method according to claim 35, in which the polymer is applied by coating.

38. A method according to claim 35, in which the polymer is applied by exhausting it on to the fibre.

39. A method according to claim 38, in which a treatment bath is heated to 40° C.

40. A method according to claim 35, in which the polymer is applied at 4–8% by weight on weight of goods.

41. A method according to claim 35, in which, after the treatment, the fibres are dried at a temperature no higher than 80° C.

42. A method according to claim 35, in which the fibre is a keratinous fibre pre-treated with permonosulphate, chlorine or a chlorine donor, followed by sulphite neutralisation and rinsing.

43. A method for the treatment of vegetable and/or synthetic fibre to impart water, stain and/or oil repellency with soft handle comprising treating the fibre with a polymer according to claim 1.

44. A method according to claim 43, in which the polymer is applied from a solution containing 60 g/l of polymer in water.

45. A method according to claim 44, in which the rate of application of polymer to fibre is 6% polymer by weight of fabric.

46. A method for treating a textile fabric according to claim 35.

* * * * *